United States Patent
Snowbarger et al.

(10) Patent No.: US 7,222,016 B2
(45) Date of Patent: May 22, 2007

(54) SYSTEM AND METHOD FOR TRANSFER OF FEEDBACK CONTROL FOR A PROCESS CONTROL DEVICE

(75) Inventors: Jimmie L. Snowbarger, Marshalltown, IA (US); Stephen G. Seberger, Marshalltown, IA (US); LeDoyle Pingel, Grundy Center, IA (US)

(73) Assignee: Fisher Controls International LLC, St. Louis, MO (US)

( * ) Notice: Subject to any disclaimer, the term of this patent is extended or adjusted under 35 U.S.C. 154(b) by 0 days.

(21) Appl. No.: 11/195,281

(22) Filed: Aug. 2, 2005

(65) Prior Publication Data

US 2006/0031001 A1   Feb. 9, 2006

Related U.S. Application Data (60) Provisional application No. 60/598,701, filed on Aug. 4, 2004.

(51) Int. Cl.
  *G06F 219/00*   (2006.01)
(52) U.S. Cl. .................................. 701/114; 701/101
(58) Field of Classification Search ................ 123/361, 123/396, 399, 672, 674, 679, 688; 701/101–103, 701/114, 115; 60/274, 276
  See application file for complete search history.

(56) References Cited

U.S. PATENT DOCUMENTS

| | | | | |
|---|---|---|---|---|
| 4,903,671 | A | * | 2/1990 | Araki et al. .................. 123/682 |
| 4,924,836 | A | * | 5/1990 | Uchida et al. ............... 123/674 |
| 5,343,701 | A | * | 9/1994 | Douta et al. .................. 60/276 |
| 5,473,888 | A | * | 12/1995 | Douta et al. .................. 60/276 |
| 5,638,272 | A | * | 6/1997 | Minowa et al. ............. 123/396 |
| 5,685,277 | A | * | 11/1997 | Pallett et al. ................ 123/396 |

(Continued)

FOREIGN PATENT DOCUMENTS

EP   1 049 229 A1   11/2000

(Continued)

OTHER PUBLICATIONS

D. Perkins et al., "Duplex versus triplex architectures for process control systems," *Hydrocarbon Processing*, pp. 67-75 (Jun. 2003).

(Continued)

*Primary Examiner*—Willis R. Wolfe, Jr.
(74) *Attorney, Agent, or Firm*—Marshall, Gerstein & Borun LLP (57) ABSTRACT

Disclosed herein is a controller and method useful for transferring control of a process control device between first and second control modes. The controller includes first and second servo control modules that generate first and second drive signals based on feedback information from first and second sensors for control of the process control device in accordance with first and second control modes, respectively. The controller also includes a feedback control transfer module that transfers control of the operation of the process control device from the first control mode to the second control mode based on the feedback information from the first sensor. In certain embodiments, such control transfer involves a control routine that initially generates the second drive signal based on the first drive signal to effectuate a smooth, bumpless transfer between the control modes.

28 Claims, 5 Drawing Sheets

U.S. PATENT DOCUMENTS 6,732,707 B2 * 5/2004 Kidokoro et al. ........... 123/396
2003/0183194 A1 * 10/2003 Noguchi ..................... 123/396

FOREIGN PATENT DOCUMENTS

WO      W0-98/14853      4/1998

OTHER PUBLICATIONS

"U-200 Unit Controller: A Complete Unit Control Solution," www.miconsystems.com/u200gen.htm (1996-2000).

Rammler, R., "Fault-Tolerant Control Strategy Configuration," www.miconsystems.com/papers/fault.htm (1996-2000).

"Commissioning of Static Excitation on a 600MW Cross Compound Generator", Anderson et al., Life management of power plants, Dec. 12-14, 1994, Conference Publication No. 401, © IEE 1994, pp. 236-248.

International Search Report received in International (PCT) Application PCT/US2005/027754, by the European Patent Office, dated Jan. 18, 2006.

Written Opinion for Application PCT/US2005/027754 by the European Patent Office, dated Jan. 18, 2006.

* cited by examiner

SYSTEM AND METHOD FOR TRANSFER OF FEEDBACK CONTROL FOR A PROCESS CONTROL DEVICE

RELATED APPLICATION

This application claims the benefit of U.S. provisional application Ser. No. 60/598,701, entitled "System and Method for Transfer of Feedback Control for a Process Control Device," which was filed on Aug. 4, 2004, the disclosure of which is hereby incorporated by reference in its entirety.

BACKGROUND OF THE DISCLOSURE

1. Field of the Disclosure

The disclosure generally relates to process control devices and, more specifically, to a system and method for controlling process control devices having multiple feedback control mechanisms.

2. Brief Description of Related Technology

A variety of control mechanisms may be used to control a valve/actuator assembly or other process control device. For instance, valve controllers typically use a form of feedback control to control the valve/actuator assembly. The feedback control relies on an error signal, which, in turn, is based on the difference between a desired set point signal and a feedback signal from a sensor, the feedback signal providing an indication of the operation of the valve/actuator assembly. The output of the valve controller is a correcting control signal, which in the past was a pneumatic signal proportional to the error signal.

While pneumatically driven actuators remain common, conventional control devices also incorporate non-pneumatic elements, such that the pneumatic signals are typically determined by electronic controllers, sensors or transducers (e.g., a digital valve controller). More particularly, the electronic controller executes a control routine that processes the error signal to generate a control signal, which may be converted to a current or other analog control signal, which, in turn, is fed to an electro-pneumatic converter, such as a current-to-pressure transducer within the valve controller to produce the pneumatic signal. Such control signal, whether analog or digital, may be referred to hereinafter in certain instances as a drive signal.

In most cases, a drive signal is generated from one of three types of control algorithms: (i) Proportional; (ii) a Proportional plus Derivative; and, (iii) a Proportional plus Derivative plus Integral. The Proportional (P) type control algorithm generates a drive signal directly proportional to the error signal. The Proportional plus Derivative (PD) type control algorithm generates a drive signal that is the sum of a signal proportional to the error signal and a signal that is proportional to the rate of change of the error signal. The Proportional plus Derivative plus Integral (PID) type control algorithm generates a drive signal that is the sum of a signal proportional to the error signal, a signal that is proportional to the rate of change of the error signal, and a signal that is proportional to the integral of the error signal.

The feedback signal that determines the error signal may be directly or indirectly indicative of the operation of the valve/actuator assembly. For example, one indication of the flow through the valve/actuator assembly involves a position sensor that generates a signal indicative of the position of the valve. To this end, valve/actuator assembly designs often include mechanical linkage between a position sensor and the valve to detect valve position. The position sensor is then coupled to the mechanical linkage to generate the valve position signal. A system having a feedback control mechanism based on a position sensor is often said to rely on position control.

Controllers for valves having a pneumatically driven actuator have utilized a pressure sensor as an alternative to position control. In this case, a pressure sensor provides an indication of flow through the valve because the actuator of the valve/actuator assembly has a spring, the compression of which is approximately proportional to the pressure applied thereto. This control mechanism is often referred to as pressure control.

Older process controllers, particularly those that predate microcomputers, often relied upon pressure control rather than position control. As these systems were modernized, certain components of the system were replaced or upgraded to include aspects of digital control. For example, a pneumatic pressure control for a valve could be replaced by a digital controller. To avoid a shutdown of the process, if not the entire plant, the new digital valve controller included pressure control to simplify the replacement and installation process. In this way, the older, pneumatic control could be replaced without having to replace or modify the valve/actuator assembly. As a result, the replacement of the old, pneumatic device, and the accompanying installation of the new, digital controller, avoided disturbing or discontinuing the operation of the valve or, more generally, the process. This replacement and installation process is known as hot cutover.

An example of a digital controller capable of hot cutover installation is the FIELDVUE™ Digital Valve Controller Type DVC5000 Series, specifically DVC5000f, Firmware Version 9, manufactured by Emerson Process Management-Fisher (Marshalltown, Iowa). The DVC5000f includes a pressure sensor and the associated pressure control routine in the interest of enabling hot cutover. The DVC5000f controller also includes a position sensor and the capability of selecting position control for those installations compatible with position control. As stated hereinabove, many installations involving a replacement did not support position control. In these cases, installation of the mechanical linkages between the valve and the position sensor would require either replacement or maintenance of the valve, most likely involving process shutdown. As a result, the DVC5000f would be first installed with pressure control as the feedback mechanism in operation. When a process or plant shutdown occurred, the valve/actuator assembly would be configured for position control. Thus, installation and use of a DVC5000f controller was often a two-step process, including an initial step of hot cutover to digital pressure control followed by a subsequent selection of position control once the linkages and other mechanical and/or valve components were installed during a shutdown. To enable the manual selection of position control, an interface made available to the operator provided an option to change a control parameter and thereby switch from pressure to position control.

During normal operation, control of a valve through position feedback is preferred over other feedback mechanisms that are more indirectly indicative of valve operation. Unfortunately, control using only position feedback is completely dependent upon a position sensing mechanism that is subject to failure. Past digital valve controllers have not provided for continued operation of the valve in the face of such failure events or other contingencies related to position sensor failure. As a result, and as a consequence of the nature of feedback control, a valve can be rendered inoperative by a faulty sensor despite the otherwise healthy condition of the valve. Once rendered inoperative, the valve, in turn, may cause an undesirable and unnecessary shutdown of the process or plant.

SUMMARY OF THE DISCLOSURE

In accordance with one aspect of the disclosure, a controller for a process control device with first and second sensors that generate respective feedback information indicative of operation of the process control device includes a first servo control module to generate a first drive signal based on the feedback information from the first sensor for control of the process control device in accordance with a first control mode, and a second servo control module to generate a second drive signal based on the feedback information from the second sensor for control of the process control device in accordance with a second control mode. The controller further includes a feedback control transfer module to transfer control of the operation of the process control device from the first control mode to the second control mode based on the feedback information from the first sensor.

In some embodiments, the feedback control transfer module includes a failure detection module capable of detecting that the feedback information from the first sensor is no longer sufficiently indicative of the operation of the process control device. The feedback control transfer module may be responsive to a user command to initiate transfer of the control of the process control device from the first control mode to the second control mode.

The feedback control transfer module may include a memory that maintains a record of the feedback information from the first sensor. Then, the feedback control transfer module is capable of extracting a portion of the feedback information indicative of uncorrupted data recently received from the first sensor. The second servo control module may then include an integral controller component having an output signal that is adjusted based on the portion of the feedback information indicative of uncorrupted data to minimize discontinuous movement of the process control device during transfer of the control of the process control device from the first control mode to the second control mode.

In some cases, the feedback control transfer module and the second servo control module adjust the second drive signal based on the first drive signal in preparation for a transfer of feedback control of the process control device from the first control mode to the second control mode. The second drive signal may be adjusted such that the first and second drive signals are equal upon the transfer of feedback control. The second servo control module may include an integral controller component, an output signal of which is adjusted such that the second drive signal equals the control signal in the preparation for the transfer of feedback control. The integral controller component may include an accumulator, and the accumulator may be reset to adjust the second drive signal in the preparation for the transfer of feedback control. Alternatively, or in addition, the second servo control module continuously calculates an adjustment factor based on the control signal to be utilized to adjust the second drive signal upon direction from the feedback control transfer module.

In accordance with another aspect of the disclosure, a method of controlling a process control device includes the steps of generating a first drive signal for control of the process control device in accordance with a first servo control mode, generating a second drive signal for control of the process control device in accordance with a second servo control mode, and generating a control signal for the process control device in accordance with the first servo control mode and from the first drive signal. The method further includes the steps of receiving a feedback signal indicative of the operation of the process control device in response to the control signal, and transferring control of the process control device to the second servo control mode during operation of the process control device based on the feedback signal such that the control signal will be generated from the second drive signal.

In some embodiments, the control transferring step includes the step of detecting a failure in the operation of the process control device. The failure detecting step may include the step of analyzing the feedback signal to determine whether a sensor of the process control device associated with the first servo control mode has failed. The feedback analysis step, the failure detecting step, and the control transferring step may be performed autonomously.

The first and second servo control modes may be responsive to position and pressure sensor of the process control device, respectively. In this and other cases, the method may further include the step of maintaining a data record of the feedback signal such that the control transferring step includes the step of extracting information from the data record indicative of uncorrupted data from the sensor (e.g., position data from the position sensor).

In some cases, the second drive signal generating step includes the step of initializing the second drive signal based on the feedback signal. The second drive signal initializing step may include the step of calculating a transition value for the first drive signal based on the feedback signal. The second drive signal initializing step may include the step of adjusting an output of an integral controller associated with the second servo control mode based on the transition value of the first drive signal. The integral controller adjusting step may include the step of setting the second drive signal equal to the first drive signal.

Alternatively or additionally, the disclosed method may further include the step of receiving a second feedback signal indicative of the operation of the process control device. The control transferring step may then include the step of generating a transition level of the control signal based on the first-named feedback signal, and the second drive signal generating step may then include the step of calculating an initial level of the second drive signal based on the second feedback signal and the transition level of the control signal. The initial level calculating step may then include the step of calculating proportional and derivative controller values from the second feedback signal, and the initial level calculating step may include the step of resetting an accumulator output of an integral controller associated with the second servo control mode based on a difference between the transition level of the control signal and a sum of the proportional and derivative controller values.

In accordance with yet another aspect of the disclosure, a method is useful for controlling a process control device with first and second sensors that generate respective feedback information indicative of operation of the process control device. A first drive signal is generated based on the feedback information from the first sensor, and the first drive signal is provided to the process control device to control operation of the process control device. Control of the process control device is transferred to a second drive signal based on the second sensor by initially generating the second drive signal based on the first drive signal.

BRIEF DESCRIPTION OF THE DRAWING FIGURES

For a more complete understanding of the disclosed controller and method, reference should be made to the following detailed description and accompanying drawing wherein.

While the disclosed controller and method are susceptible of embodiments in various forms, there are illustrated in the drawing (and will hereinafter be described) specific embodiments of the invention, with the understanding that the disclosure is intended to be illustrative, and is not intended to limit the invention to the specific embodiments described and illustrated herein.

DETAILED DESCRIPTION OF PREFERRED EMBODIMENTS

The disclosed controller and method generally relate to feedback control mechanisms for a process control device, such as a valve. While the disclosed controller and method are described in detail in conjunction with a pneumatically actuated valve, the disclosed controller and method are suitable for use and practice with valves actuated in other ways, and process control devices other than valves. Accordingly, the disclosed controller and method may be used or practiced in conjunction with any device within a process control network and is particularly well suited for use with devices that have two or more possible feedback mechanisms available for control. The exemplary embodiments described herein present the controller and method in the context of a transfer of feedback control between two different control mechanisms, although use of the disclosed controller and method in connection with two feedback controls of the same or similar type is also possible. Accordingly, and for example, the disclosed controller and method may be used in situations presenting feedback control based on two sensors of the same type (e.g., a primary position sensor and a backup, or secondary, position sensor).

Generally speaking, the controller and method described herein are useful in the context of a transfer of feedback control for a process control device. The disclosed controller and method are also particularly useful for ensuring (i) continued operation of the process control device in the event of a failure associated with the feedback control mechanism, and (ii) smooth operation of the process control device during each such transfer of feedback control. To the extent that such control transfer can be executed in a smooth, continuous, and/or interruption-free manner, a shutdown or other disruption of the process in which the process control device is operating can be avoided. While the disclosed controller and method are designed to support such continued operation in the face of a malfunction or other failure, use of the controller and method is not limited to any particular context or circumstance for the transfer of feedback control. In fact, in certain embodiments, the transfer of feedback control may be initiated and controlled, either in whole or in part, at the discretion of an operator.

Transfer of feedback control in accordance with the disclosed controller and method is based on the feedback information generated by a sensor used by the current feedback control scheme, i.e., the sensor attempting to deliver an indication of the operation of the valve prior to transfer of control. That is, the control transfer relies on the feedback information generated by the sensor utilized by the current feedback control scheme. For example, the transfer of feedback control may be triggered by an analytical or other determination that the feedback information is no longer sufficiently indicative of the operation of the valve. In this case, transfer of feedback control is warranted before the valve is directed to an improper position or state based on faulty feedback information. Another type of transfer implemented by the disclosed controller and method generally involves use of the feedback information to ensure that the subsequent, or target, feedback control scheme initially positions the valve at a point near or equal to where the prior, or initial, feedback control scheme left the valve. To this end, the target feedback control scheme is adjusted for smooth operation of the valve regardless of whether its associated sensor would have, acting in isolation, led to the generation of an error signal (and drive signal) that would have moved the valve dramatically and/or abruptly upon transfer of control. Alternatively, if the current feedback control scheme is under suspicion of operating based on faulty feedback information, as in the context of a failed sensor, then a control transfer may involve a target feedback control scheme that is adjusted to position the valve at the point associated with the last feedback information known to be valid (as opposed to the most recent feedback information, which corresponds with the position where the initial feedback control scheme may have left off). And if the first transfer is indeed occasioned by a faulty sensor or other malfunctioning device, then the controller and method may generally be used to ensure a smooth, second transfer back to the initial feedback control scheme after the faulty sensor or other device has been replaced or repaired.

Figure 1:
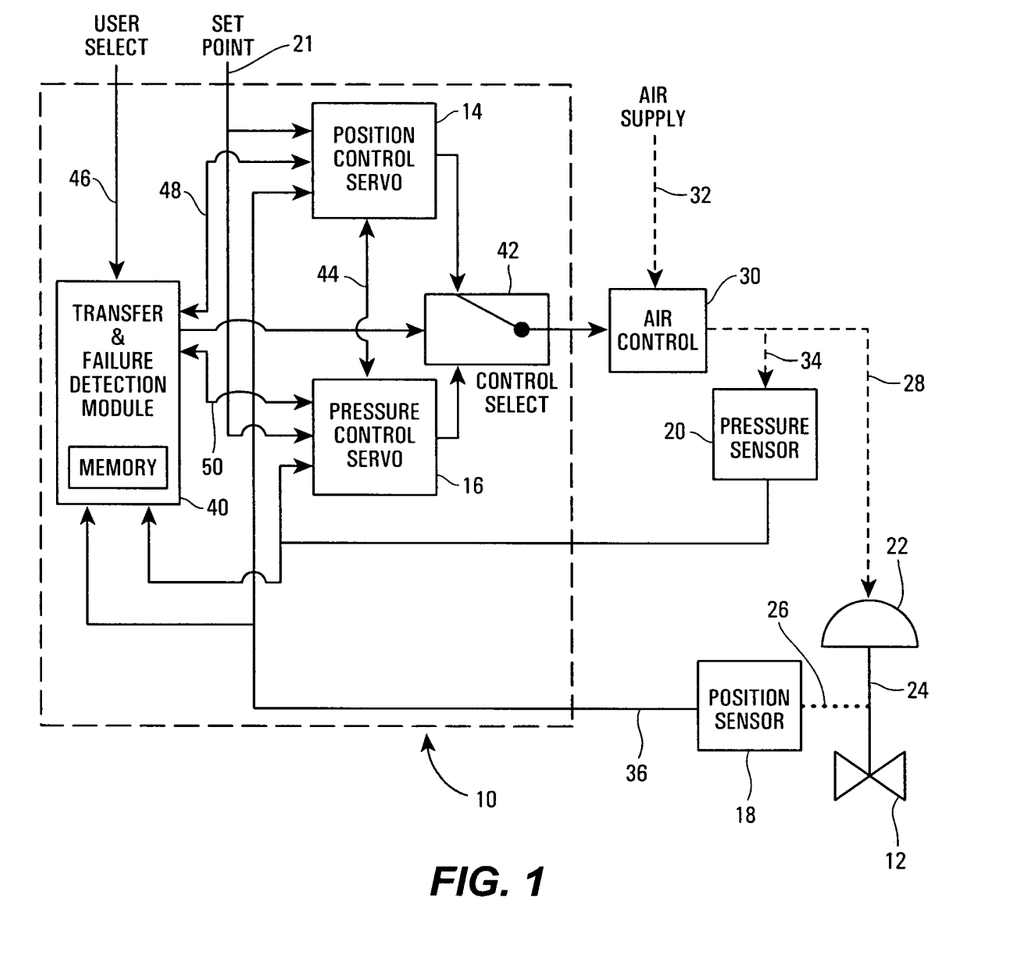
FIG. 1 is a block diagram of a controller coupled to a valve/actuator assembly for control of the valve/actuator assembly in accordance with one embodiment of the disclosure.

With reference to FIG. 1, an exemplary controller capable of implementing feedback control transfer between multiple feedback control mechanisms is indicated generally at 10. In some cases, the controller 10 is a digital valve controller having embedded software or code to implement multiple feedback control schemes for a valve 12. As will be explained further below, the controller 10 may include multiple servo control modules for the execution of two or more feedback control routines for control of the valve 12. The controller 10 and each of its servo control modules may be implemented via a digital microprocessor-based computer configured for execution of the software or code associated with the feedback control schemes and routines. In this example, a position control servo module 14 and a pressure control servo module 16 receive feedback information indicative of the operation of the valve 12 via feedback signals generated by a position sensor 18 and a pressure sensor 20, respectively. The position sensor 18 provides feedback information directly indicative of the position of the valve 12, or valve travel, while the pressure sensor 20 provides feedback information indirectly indicative of the position of the valve 12 due to the manner in which valve movement is actuated.

The position and pressure control servo modules 14 and 16 also receive data indicative of the set point for the valve 12, shown in FIG. 1 as an input signal to the controller 10 via a line 21. It should be noted that the controller 10 includes any input/output hardware (not shown) and, more generally, any functionality appropriate for interpreting the data provided via the line 21, or the signals provided by the position sensor 18, the pressure sensor 20, and any other devices coupled thereto. Such hardware and functionality are well known to those skilled in the art, and will not be described in detail herein, except to note as well that the controller 10 may also be capable of performing any applicable conversions, such as an analog-to-digital conversion in preparation for digital processing.

The operation of the valve 12 will not be described in detail, inasmuch as the nature of the valve 12 is not germane to the practice of the disclosed controller and method. In fact, the valve 12 may be any process control device subject to control via feedback, and especially those devices the operation of which may be evaluated independently by two or more sensors. Such independent evaluation of the valve 12 or other device, in this case by the position sensor 18 and the pressure sensor 20, enables two, independent control schemes. In general, the two or more control schemes need not present different types of control schemes, but instead may involve a degree of redundancy in the form of two or more sensors of the same type.

Regardless of the nature of the control schemes, operation of the valve 12 at any one point in time relies on the execution of one of the control schemes to drive an actuator 22. To conserve power between control transfers, the controller 10 may limit execution at any one point in time to one control scheme (i.e., the scheme responsible for driving the actuator 22), but, more generally, any number of control schemes may be executed concurrently for the purpose of, for instance, avoiding delays during control transfer. The actuator 22, in turn, provides mechanical force to change the position or state of the valve 12. The valve 12 and actuator 22 form a valve/actuator assembly having a mechanical coupler 24 coupling the valve 12 to the actuator 22. Generally speaking, the mechanical coupler 24 and other components of the actuator 22 translate an input force into the mechanical force needed to move the valve 12. The position sensor 18 may be in communication with these components of the actuator, such as the mechanical coupler 24, or with any other component of the valve/actuator assembly, to derive the position of the valve 12. For example, the position sensor 18 may be structurally linked to the valve/actuator assembly via mechanical linkage 26 (as shown in dotted line fashion in FIG. 1), but any other mode of communication (e.g., optical) known to those skilled in the art may be utilized.

In this exemplary embodiment, the actuator 22 includes a spring-biased component (not shown) upon which a pneumatic force is exerted via a pneumatic line 28 shown, as with other pneumatic lines, in dashed-line fashion in FIG. 1. The air or other fluid in line 28 is supplied by an air control device 30, which may include a current-to-pressure transducer and other common components for pneumatic controls, such as a relay or other component for pressure amplification of an air supply provided via line 32.

The spring-biased component of the actuator 22 acted upon by the pneumatic force is displaced in accordance with the effective spring constant of the actuator 22. That displacement, in turn, can be correlated with the position of the valve 12 based on the mechanical coupler 24 and any other intermediate components. As a result, the pressure of the fluid in the line 28 can be used to derive an indication of the flow through the valve, albeit indirectly. Because of the indirect nature of this indication of valve position, the data generated by the pressure sensor 20 may not be as accurate as that provided by other sensing methods, such as one that measures position. Thus, the pressure sensor 20, and the associated pressure control servo module 16, may serve in a secondary (or non-primary) role for the controller 10 to be used, for example, as a backup (or fallback) to one or more other feedback control schemes.

The position sensor 18 and the pressure sensor 20 provide respective feedback signals on lines 36 and 38 back to the controller 10. The two feedback signals establish two feedback control mechanisms, a primary mechanism for normal operation and a secondary mechanism for a backup or fallback mode of operation. The feedback signal with the highest accuracy or preference generally, in this case the signal on the line 36 from the position sensor 18, may be determinative of which feedback control mechanism serves as the primary mechanism. In this case, the primary feedback control mechanism involves execution of the position control routine by the position control servo module 14. Such execution may continue, for instance, as long as the position sensor 18 and the position control scheme are operating normally (e.g., within specifications for the position sensor 18, and/or otherwise providing an accurate indication of valve position). In the event that the position sensor 18 is no longer providing an accurate indication of valve position, or the position control scheme is suspected of improper operation for any other reason, the controller 10 is capable of switching to the secondary control mechanism, i.e., the pressure control routine executed by the pressure control servo module 16. In this manner, the controller 10 maintains valve operation and thereby avoids shutdown of the process or plant in which the valve 12 is operating.

Each feedback signal is provided to a transfer and failure detection module 40 to detect a sensor failure or other feedback control malfunction. As shown in FIG. 1, the transfer and failure detection module 40 may include a memory for storing past values of each feedback signal as well as other data or information indicative of the operation of the two feedback control schemes, as will be explained further below. The transfer and failure detection module 40 generates a control signal capable of toggling a control select switch 42 of the controller 10 in the event that a failure or malfunction is detected. In this way, and for example, an autonomous decision to transfer from the position control scheme, i.e., the primary control scheme, to the pressure control scheme, is based on whether the position control scheme continues to operate effectively. The transfer and failure detection module 40 will direct a transfer of control based on its analysis of the feedback signal associated with the position control scheme (i.e., the signal generated by the position sensor 18), the drive signal generated by the position control scheme (which, in turn, is based on the feedback signal), or any other information or data indicative of the operation of the position control scheme in response to the feedback signal. For instance, the transfer and failure detection module 40 may be capable of detecting that the position sensor 18 goes off-line or provides a signal outside of specification due to a broken linkage.

The control select switch 42 need not be a physical switch, such as a relay, and instead may be implemented in software or firmware within the controller 10. As a result, the control signal may take on any one of a number of forms (e.g., digital, analog, etc.) appropriate to the type of switch. In any case, the control select switch 42 selects one of the drive signals generated by the feedback control schemes, in this case, the drive signals generated by the position control servo module 14 and the pressure control servo module 16. The drive signal selected by the control select switch 42 is then delivered as a digital, analog, or other electronic control signal to the air control device 30.

In accordance with the embodiment of FIG. 1, a line 44 couples the position control servo module 14 to the pressure control servo module 16. The line 44 is indicative of a communication link between the two feedback control schemes and, as such, may be representative of the passing of data from one executing feedback control routine to another. The line 44 may therefore be realized in software or firmware, and need not constitute a physical hardwiring within the controller. As will be explained further below, such communication between the multiple control schemes enables smooth transfers of control. More particularly, the initial implementation of a target feedback control scheme may be based on the drive signal, feedback signal, or other data generated by or in connection with the prior, or initial, control scheme to effectuate a smooth transfer of feedback control from one scheme to another. The need for such control transfer need not arise from a failure or malfunction, as discussed above in connection with the transfer and failure detection module 40. For instance, such control transfer may occur at the discretion of an operator, but the desirability of ensuring a smooth control transfer remains. Such discretionary control transfer may occur in connection with a transfer of feedback control from the secondary control scheme back to the primary control scheme once the problem associated with the failure or malfunction has been addressed. The decision to transfer control back to the primary control scheme, or more generally, any other feedback control transfer, may be triggered or directed by a user or operator, as shown in FIG. 1 via a user select line 46 that provides an input signal to the controller 10. The user select line 46 and the input signal carried thereby may be realized via a user interface that provides a parameter selection capability, as is well known to those skilled in the art.

Lines 48 and 50 represent communication links between the transfer and failure detection module 40 and the position and pressure control servo modules 14 and 16, respectively. Such communication may include the delivery of a command to initiate execution of the feedback control routine. Such communication may also be bi-directional to support the effectuation of smooth transfers of feedback control. In this way, communication between the two control schemes need not be direct via the line 44, but rather may alternatively be accomplished indirectly via the lines 48 and 50 and the transfer and failure detection module 40.

Figure 2:
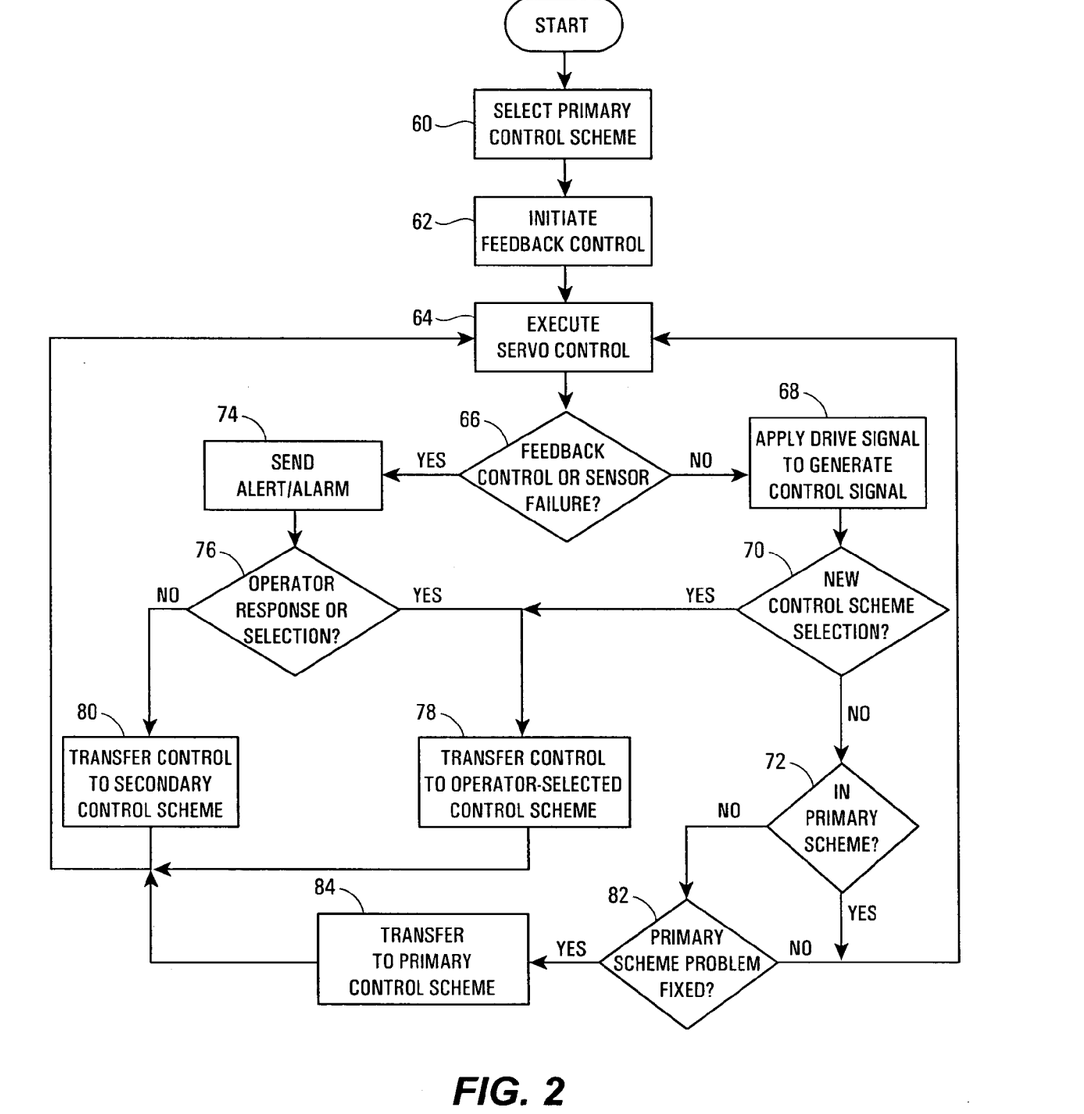
FIG. 2 is a flow diagram of a feedback control routine executed by the controller of FIG. 1 in accordance with one embodiment of the disclosure.

FIG. 2 shows a feedback control routine executed by the controller 10 (FIG. 1) in connection with one embodiment of the disclosure. The feedback control routine may form a portion of the embedded code stored in one or more memories of the controller 10 for execution by a microprocessor thereof. Such embedded code, and the steps of the feedback control routine implemented thereby, may be associated with one or more of the position control servo module 14 (FIG. 1), the pressure control servo module 16 (FIG. 1), and the transfer and failure detection module 40 (FIG. 1).

Operation of the controller 10 and, therefore, execution of the routine of FIG. 2, may be autonomous or, alternatively or additionally, initiated and terminated by operator control. In either case, once initiated, the routine forms an operational loop that provides for autonomous control of the valve/actuator assembly. The operational loop also provides for user-based control, including the right to re-initiate or terminate the execution of the routine at any time.

The routine may begin with the identification or selection of primary and secondary feedback control schemes in a block 60. For example, the control select switch 42 (FIG. 1) may be set at this time such that the control signal generated by the controller 10 is primarily derived from the drive signal generated by the position control servo module 14 (FIG. 1). Alternatively, the control select switch 42 is already set, and the primary and secondary feedback control schemes are predetermined or established by virtue of the nature of the valve 12 and its associated components. Generally speaking, the identification of control schemes will be determined by the availability of an associated sensor such that, in the exemplary embodiment of FIG. 1, the primary control scheme is a position control scheme and the secondary control scheme is a pressure control scheme. Once the primary control scheme is selected, the controller 10 may perform an initialization routine in a block 62, which may include resetting components (e.g., a PID controller of the position control servo module 14) of the controller 10 and confirming that the sensor (e.g., the position sensor 26) associated with the primary control scheme is on-line and otherwise operational. It should be noted that the controller 10 may initialize and begin to execute (in the background) feedback control routines in addition to the primary feedback control routine at this point. The initialization routine may also include calibration procedures for one or more sensors and/or the valve/actuator assembly. For instance, an automatic calibration procedure could use existing position sensor calibration data to determine the "bench set" of the actuator/valve assembly. This procedure provides the pressure range required to completely open and close the valve 12. This pressure range, in turn, may establish or set the pressure control range for the pressure applied to the actuator 22, mapping 0–100% of desired valve position to the corresponding applied pressures.

After the controller 10 has performed the initialization routine, the current feedback control scheme is executed in a block 64. In the exemplary embodiment of FIG. 1, the position control servo module 14 receives the current set point and other input data, such as the feedback information from the position sensor 18, and then processes the data to generate the drive signal. The manner in which the drive signal is generated is explained further below, but generally speaking the drive signal may be generated in the block 64 using standard PID controller techniques and control algorithms.

A feedback control error detection step is also performed. In the exemplary embodiment of FIG. 1, the error detection step may be executed by the transfer and failure detection module 40. As shown, for example, in the routine of FIG. 2, control passes to a decision block 66 that determines whether a sensor failure or other feedback control error has occurred. A sensor failure may involve the feedback information indicating that the sensor has gone off-line. The feedback information may alternatively be indicative of a valve position that is not possible. Another way in which the feedback information may indicate an off-line or malfunctioning sensor is through delivery of data outside of the specifications for the sensor. Still other ways to detect sensor or other failure or malfunction known to those skilled in the art now or in the future may be employed.

Execution of the error detection step in the block 66 is shown as following the generation of the drive signal in the block 64 so that the drive signal (or other signals or data generated from the feedback signal) may also be analyzed as part of the error detection check. Alternatively, the block 66 may be executed prior to, or concurrently with, the generation of the drive signal. In such cases, the error detection step may be primarily directed to analyzing whether a sensor failure has occurred. In an alternative embodiment, the block 64 may also include an evaluation of the feedback information as the feedback information is processed. For example, the position control servo module 14 (FIG. 1) may routinely check to determine whether the position sensor 18 is operating outside of specifications or has otherwise failed. In some embodiments, the controller 10 may continuously perform such an evaluation of the position sensor 18 (and other sensors). Accordingly, it should be noted that the block 66 may be performed in conjunction with other blocks in the routine, and/or at other points in the routine, such that practice of the disclosed control method is not limited to the exact sequence of steps shown in FIG. 2. Still other modifications to permit alternative (and/or additional) failure detection steps will be apparent to those skilled in the art.

Generally speaking, if a feedback control error is not detected, the drive signal generated by the current feedback control scheme (e.g., by the position control servo module 14) is provided in a block 68 as the control signal to control the valve/actuator assembly. Next, a pair of decision blocks 70 and 72 check the status of the controller 10 before allowing the next iteration of the servo control routine to be executed. In the exemplary embodiment of FIG. 2, the first status check determines in the block 70 whether an operator has selected a new feedback control scheme, while the second status check determines in the block 72 whether the primary feedback control scheme is currently being executed. These and other status checks may be executed at any point in the routine, in either continuous or discrete fashion, and are only shown in FIG. 2 at this point in the routine for ease of illustration. As shown in the exemplary embodiment of FIG. 2, control will loop back to the block 64 for the next iteration of the servo control routine as long as the operator has not decided to switch control from the primary control scheme (e.g., position control) to the secondary control scheme (e.g., pressure control).

The remaining portions of the routine shown in FIG. 2 are directed to a number of different circumstances in which feedback control may be transferred from one feedback control scheme to another feedback control scheme. In one circumstance, a transfer of feedback control may occur in connection with a sensor failure or other error associated with a feedback control scheme. For example, the block 66 may detect an error or failure and, as a result, pass control to a block 74 that, in turn, sends an alert, alarm or other message to the operator indicating that the error or failure has occurred. Next, a block 76 determines whether the operator has selected a new feedback control scheme in response to the alert, alarm or other message regarding the failure or error. In this way, a transfer to a secondary feedback control scheme occurs during operation of the controller 10 (and, more generally, the valve 12) in a block 78, and is based on feedback information associated with, or provided in connection with, the primary feedback control scheme. In this case, the feedback information is indicative of a problem or error associated with the primary feedback control scheme. Despite the problem, the control transfer allows the valve 12 to remain in operation. More generally, and as shown for example in connection with the block 70, the block 78 is executed with other control scheme transfers initiated by the operator as well.

Control scheme transfer in accordance with the disclosed controller and method also includes autonomous actions taken by the controller 10. For example, an autonomous transfer may occur in a block 80 in the event that the operator does not respond to the alert or alarm generated in the block 74, or if the embodiment of the controller 10 does not include an alarm or alert function. Thus, in certain embodiments, the controller 10 may be installed or configured in a manner to automatically fallback to the secondary control scheme in the event of a failure, error or problem associated with the primary control scheme. In any case, the transfer operation executed in the block 80 transfers feedback control to the secondary control scheme once the analysis and/or processing of the feedback information associated with the primary control scheme results in the detection of the failure, error or problem.

Another example of an autonomous transfer involves the circumstance in which the controller 10 has the opportunity to switch back from the secondary control scheme to the primary control scheme. This circumstance may arise, for instance, after a problem with the position sensor 18 has been addressed (e.g., a repair of the linkage between the position sensor 18 and the valve/actuator assembly). More particularly, and with reference to the exemplary embodiment of FIG. 2, feedback control previously has been switched to the secondary control scheme (e.g., pressure control) as a result of the execution of one of the blocks 78 and 80 after a failure or problem occurred in connection with the primary control scheme. One or more iterations of the loop involving the blocks 64, 66, 68, 70 and 72 is then executed, such that the valve 12 is being controlled by the pressure servo control module 16 (FIG. 1). During each execution of the loop, the block 72 determines that the controller 10 is not in the primary control scheme, and control passes to a block 82 that queries whether the problem giving rise to the initial control transfer has been fixed or addressed. If the problem has been fixed, control passes to a block 84 that effectuates the transfer back to the primary control scheme. In each instance where the problem has not been fixed, another execution of the servo control routine of the block 64 is performed in accordance with the secondary control scheme. In an alternative embodiment, the sequence of the blocks 82 and 84 may include an operator-override option or other functionality to limit the ability of the controller 10 to autonomously effectuate a transfer under these circumstances. Thus, the disclosed controller and method may include a routine that allows the operator to determine whether, and at what time, a transfer back to the primary control scheme will occur after the problem with the primary control scheme has been addressed.

Figure 3:
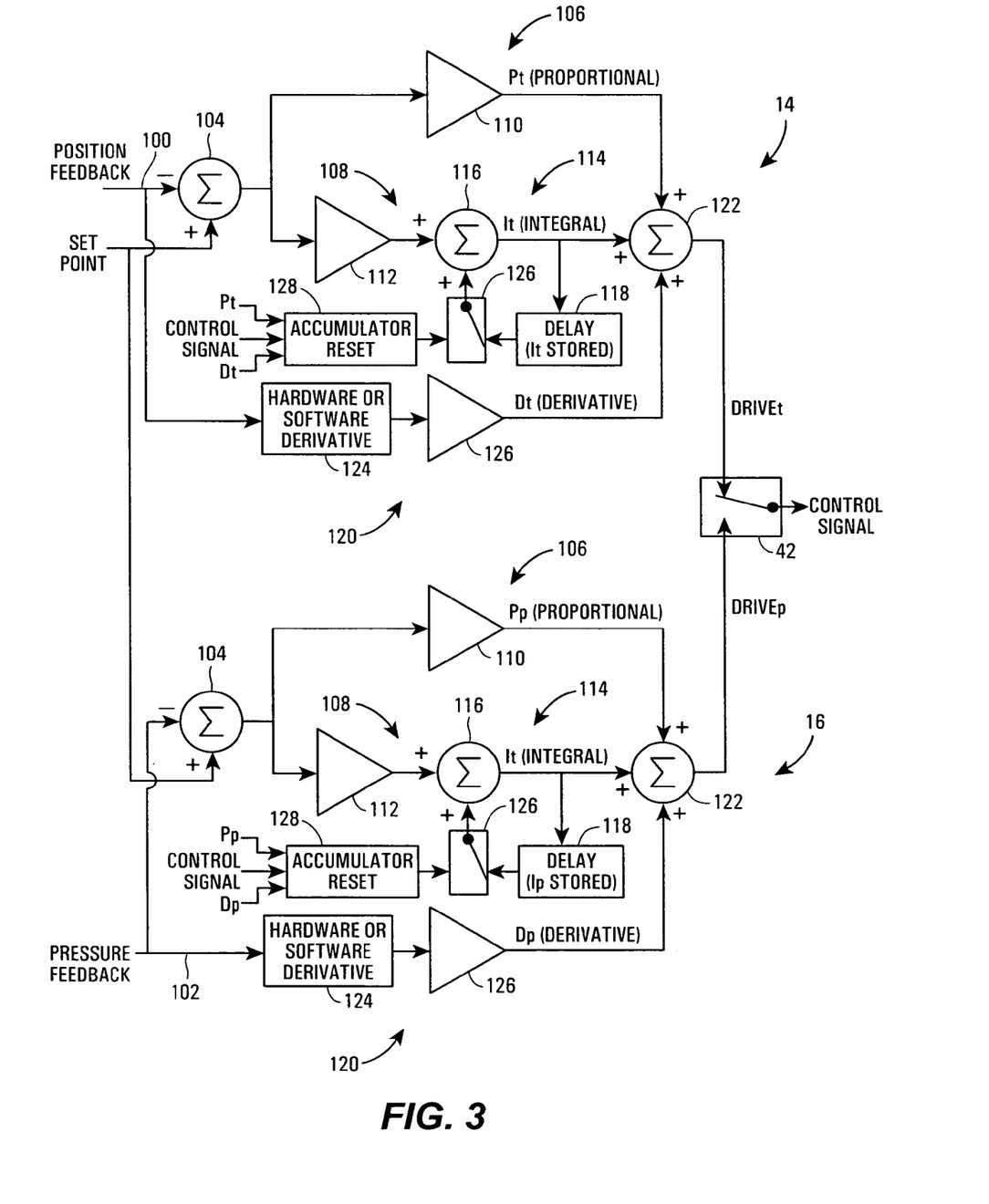
FIG. 3 is a block diagram of a pair of servo control modules of the controller of FIG. 1 in accordance with one embodiment of the disclosure having the capability of executing a feedback control transfer routine for smooth control transfer.

With reference now to FIG. 3, an embodiment of the disclosed controller and method is shown that supports transfers between feedback control schemes more generally (i.e., not simply in connection with failure or malfunction), including, for instance, a transfer from the secondary control scheme back to the primary control scheme. More particularly, the embodiment enables a smooth transfer between feedback control schemes by utilizing the control signal (or drive signal) applied to the valve/actuator assembly at the time of transfer, which, in turn, is based on the feedback information used to derive that control signal (or drive signal). In the exemplary embodiment of FIG. 3, the position control servo module 14 and the pressure control servo module 16 of FIG. 1 are shown in greater detail to include the components and capability for smooth transfer of control to the other module.

Each of the position and pressure control servo modules 14 and 16 of the exemplary embodiment of FIG. 3 includes a set of components directed to implementing a PID controller, or proportional, integral and derivative feedback control, based on a respective feedback signal and a set point. The feedback signals for the position and pressure control servo modules 14 and 16 are provided via lines 100 and 102, respectively, to enable a comparison with the set point using a summer 104. The summer 104, and other components common to this embodiment of the two servo control modules 14 and 16, shall be identified with like reference numerals for ease of description only, and with the understanding that practice of the disclosed controller and method is not limited to an embodiment where such components are shared by the two servo control modules 14 and 16. For example, execution of two separate control routines involving two separate summers 104 (or summing operations) may occur continuously and simultaneously in accordance with one embodiment. Continuous execution of a portion or all of one or more routines in the interest of such background calculation operations may advantageously provide values for immediate use, thereby removing the need for any transition period and avoiding the possibility of an unexpected loss of feedback information to implement the transition. As explained herein, such continuous calculation operations need not include every calculation involved in a control scheme, but rather may incorporate only those calculations necessary during a transfer of control (e.g., the integrator adjustment calculation). Alternatively, other embodiments may execute only a single routine between control transfers in the interest of conserving power, the single routine being capable of adjustment to implement the feedback control scheme (i.e., position control, pressure control, etc.) currently being executed.

The result of the comparison, i.e., the error signal, is provided to both a proportional controller indicated generally at 106 and an integral controller indicated generally at 108. As is known to those skilled in the art, each proportional controller 106 includes an amplifier 110 having a gain set or tuned as appropriate to generate a signal proportional to the error signal. The gain of each respective servo control module may differ based on the differing nature of the feedback signal and other aspects of the feedback control scheme. Each integral controller 108 includes an amplifier 112 having a respective gain that prepares the error signal for an accumulator indicated generally at 114 that integrates the error overtime. Each accumulator 114, in turn, includes a summer 116 and a delay element 118 that stores the previous integration value and provides it back to the summer 116. The signals generated by the proportional and integral controllers 106 and 108 are provided along with a signal generated by a derivative controller indicated generally at 120 to a summer 122 to produce a respective drive signal for the servo control module. Each derivative controller 120 includes a derivative operator 124 that generates an indication of the derivative with respect to time of the feedback signal, and an amplifier 126 having a respective gain set or tuned as known to those skilled in the art.

In accordance with the exemplary embodiment of the disclsoed controller and method shown in FIG. 3, each integral controller 108 also includes a switch 126 that permits the integral value to be reset. The switch 126 may be controlled by a signal generated as a result of a decision to transfer feedback control. The switch 126 need not be a switch in the physical or electronic sense, and may instead provide access to, or the capability to modify, the signal or value generated by the accumulator 114. In FIG. 3, such access is shown via the switch 126 disposed downstream of the delay 118. Alternatively, the switch 126 may access the accumulator 114 upstream of the delay 118 or in any other manner that provides the capability of modifying the contents of the accumulator 114. Modification of the integral value in the accumulator 114 involves a reset by a reset module 128 responsive to data from both servo control modules (i.e., the servo control modules associated with the initial and target control schemes). More particularly, the reset module 128 calculates a new value for the integral controller 108, or the accumulator 114, based on the control signal being provided at the time to the valve/actuator assembly. The control signal, in turn, is derived from the drive signal generated by the servo control module being executed for feedback control. Thus, the reset module 128 of one servo control module (e.g., the pressure control servo module 16) performs the calculation based on the drive signal of the current servo control module (e.g., the position control servo module 14), which in turn is based on the feedback information received from the respective sensor associated with the current servo control module.

As shown in FIG. 3, each reset module 128 is also responsive to the proportional and derivative controller outputs of the servo control module in which it resides (i.e., the target servo control module to which control is being transferred and, for example, Pp and Dp for the pressure control servo module 16). In this manner, each reset module 128 may execute a summation operation where the sum of the proportional and derivative controller outputs of the target servo control module are subtracted from the control or drive signal from the other servo control module (or vice versa). The resulting difference constitutes the reset value provided by the reset module 128 to adjust the integral level in the integral controller 108.

As a result of the foregoing reset operation, the drive signal generated by the target servo control module is adjusted to equal or approximate the drive signal generated by the servo control module from which control is being transferred. In either case, a smooth transfer of control is made possible. Otherwise, the valve 12 may be directed to move in an abrupt, discontinuous fashion when control is transferred. That is, without the foregoing adjustment, the drive signal of the target servo control module may be unequal to the drive signal of the servo control module from which control is being transferred. Such inequality might be large and unpredictable, based on operational errors resident in the respective sensors, the gain values set for each of the respective controllers, or any other operational characteristic of the feedback control schemes involved.

Practice of the disclosed controller and method is not limited to the arrangement of controller components shown in FIG. 3. In other words, the output of the integral controller 108 may be modified in a number of ways to adjust the drive signal of the target servo control module. In one embodiment (not shown in FIG. 3), the reset module 128 operates directly on the integral controller 108 output downstream of the summer 116. In this manner, the first drive signal generated by the target servo control module may be set exactly equal to the last drive signal of the other servo control module. Alternatively, and as shown in FIG. 3, the reset module 128 adjusts the signal provided from the delay 118 to the summer 116. In that case, the error signal provided to the amplifier 112 may modify the integral controller output after the reset module 128 has operated to modify the integral value, such that the first drive signal generated by the target servo control module is near, but not necessarily exactly equal to, the last drive signal of the other servo control module. In either case, the operational result for the valve 12 and valve/actuator assembly is a smooth transfer between feedback control schemes or, in other words, a bumpless transfer.

Figure 4:
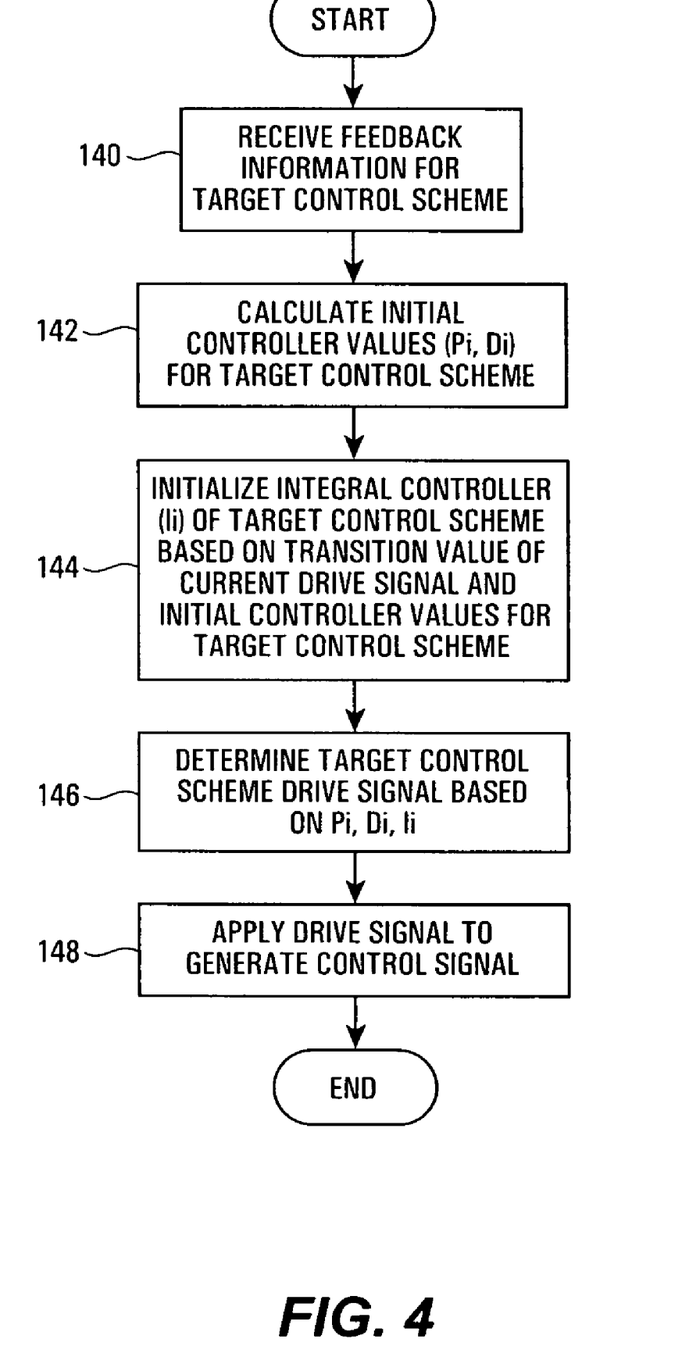
FIG. 4 is a flow diagram showing a feedback control transfer routine executed by the controller of FIG. 1 generally and, more specifically, the pair of servo control modules of FIG. 3, in accordance with one embodiment of the disclosure; and, FIG. 5 is a flow diagram showing a portion of a feedback control transfer routine executed by the controller of FIG. 1 in accordance with another embodiment of the disclosure.
Figure 5:
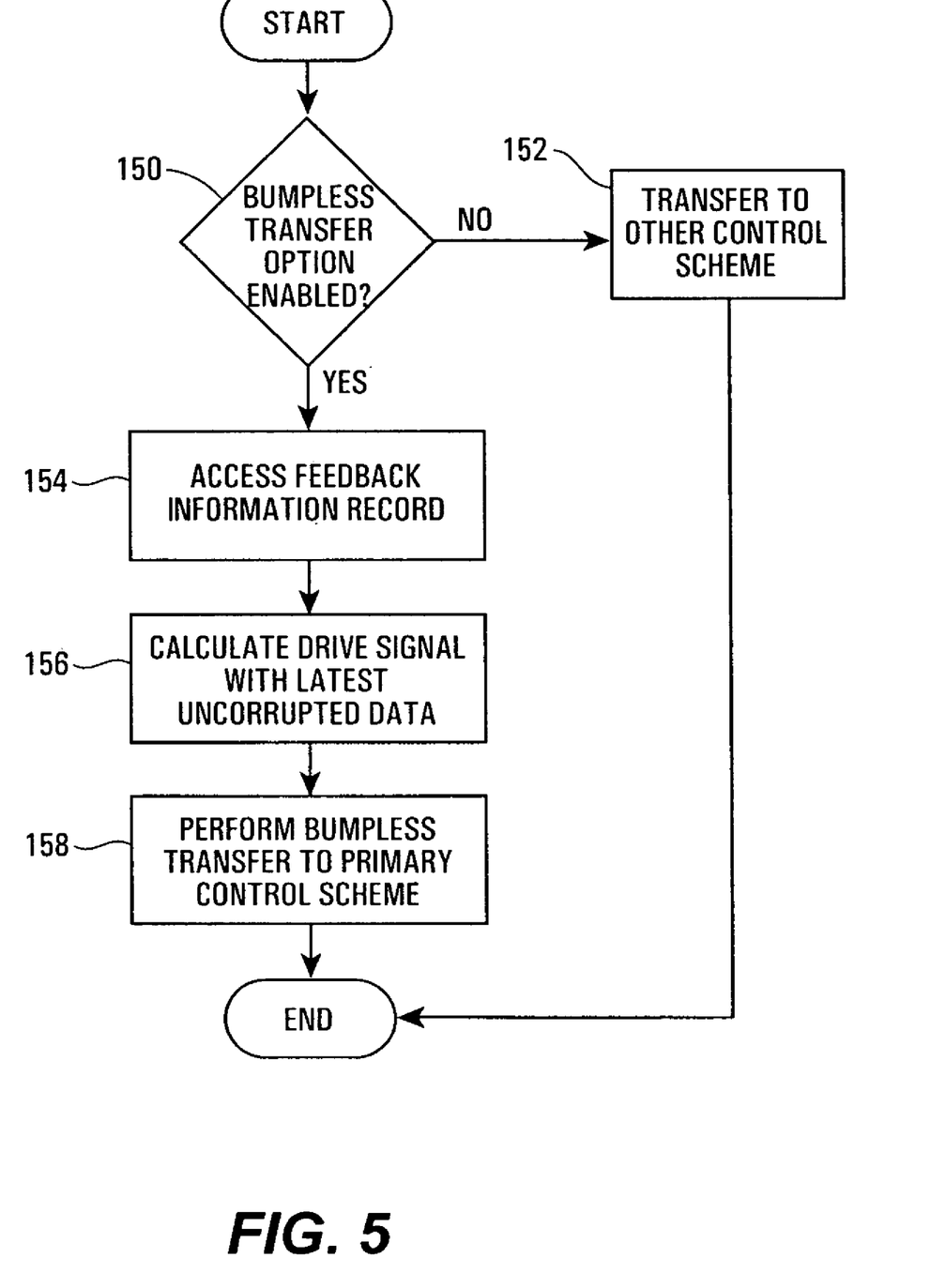

A bumpless transfer operation using, for example, the accumulator reset 128 of FIG. 3, may be implemented in connection with an operator-selected, or operator-initiated, transfer of feedback control. One example of an operator-selected transfer is in connection with the block 78 of FIG. 2. However, the steps taken in connection with the block 78 may differ based on the circumstances under which control has been passed to the block 78. More particularly, FIG. 4 shows the steps taken in accordance with one embodiment of the disclosed controller and method when the operator has initiated a control transfer apart from any error or alarm. In this case, the block 70 has passed control to the block 78 (as shown in FIG. 2), and the steps taken to effectuate the transfer may generally follow the description provided hereinabove in connection with FIG. 3. On the other hand, FIG. 5 shows the steps taken in accordance with another embodiment of the disclosed controller and method when the operator has selected a transfer of feedback control in response to an alarm or other indication of feedback control error or failure.

With reference now to FIG. 4, a bumpless transfer routine is shown for a control scheme involving a PID controller. The routine of FIG. 4 may be used in connection with all transfer circumstances, but may be particularly well suited for implementation when no feedback control errors, failures or problems are encountered. That is, the routine of FIG. 4 assumes that the initial feedback control scheme (i.e., the control scheme from which control will be transferred) is operating normally, and the latest feedback information associated therewith is accurate enough to be indicative of the operation of the device being controlled. The routine may then rely on that feedback information to perform transition calculations, as described hereinabove in connection with FIG. 3. To that end, the bumpless transfer routine starts with control passing to a block 140 in which feedback information is received for the target feedback control scheme. Initial controller values, such as the proportional and derivative controller values (Pi, Di), are then determined in a block 142 for the target feedback control scheme based on the calculations involving the error signal generated from the feedback information and the set point. Other initial feedback control calculations associated with the target servo control scheme, such as the integral controller calculations, may also occur at this point, but any calculations that may be reset in accordance with the disclosed controller and method may be delayed until after the reset operation. The reset operation is performed next in a block 144 where, generally speaking, a calculated or stored value of the target servo control scheme is initialized or reset based on the feedback information of the initial servo control scheme. That feedback information is relied upon to determine a transition value of the drive signal from the initial servo control scheme either at a point earlier in the execution sequence (for instance, in connection with the block 64 of FIG. 2), or as part of implementation of the block 144. The block 144 then performs the calculations to initialize the target servo control scheme in view of the transition value of the drive signal. For instance, the integral value (Ii) of the integral controller 108 of the target servo control scheme shown in the exemplary embodiment of FIG. 3 may be adjusted based on the comparison of the transition value of the drive signal and the initial controller values calculated in the block 142.

With continued reference to FIG. 4, the target servo control scheme is now ready to assume feedback control, and the transfer of control occurs in a block 146 with the drive signal of the target control scheme being determined from the initial controller values (e.g., Pi, Di) and any initially adjusted controller values (e.g., Ii). The drive signal is then applied in a block 148 to generate the control signal for the valve/actuator assembly. In the exemplary embodiment of FIG. 2, control may then pass to the block 64 for the next iteration of the feedback control routine associated with the target feedback control scheme, now considered the current feedback control scheme.

The bumpless transfer routine shown in FIG. 4 may also be executed in connection with non-operator initiated transfers. For example, the block 84 of FIG. 2 sets forth a circumstance in which control is transferred back to a primary control scheme from a secondary control scheme after a problem has been addressed, thereby allowing the primary control scheme to function properly. The block 84, and therefore the bumpless transfer routine of FIG. 4, may be autonomously executed upon a recognition that the problem has been addressed. Alternatively, an operator determines whether the primary scheme problem has been addressed in connection with the block 82, thereby selectively determining whether and when the control transfer of the block 84 will be implemented.

FIG. 5 shows the steps associated with a transfer of feedback control when a problem, error or failure has been detected in connection with the current feedback control scheme. See, for example, the control transfer blocks 78 and 80 of FIG. 2 associated with a feedback control or sensor failure. Under these circumstances, and generally speaking, it is not known whether the feedback information or other data associated with the current feedback control scheme can be trusted to accurately reflect the operation of the valve/actuator assembly. As a result, a bumpless transfer in accordance with the routine shown in FIG. 4, without more, may be undesirable. Instead, in the embodiment of FIG. 5, such blind transfers are avoided. To that end, a block 150 determines whether bumpless transfer is available and/or enabled. A user-selectable option may, for instance, disable bumpless transfer in the event of an alarm indicative of a sensor failure or malfunction. If bumpless transfer is not enabled or otherwise available, control passes to a block 152 that effectuates a transfer of feedback control to another control scheme without adjusting any controller values based on the feedback information associated with the now-dysfunctional control scheme.

The remainder of the routine shown in FIG. 5 is directed to when the operator has enabled bumpless transfer in the context of an alarm condition, or if bumpless transfer is generally available regardless of whether an alarm condition exists. Generally speaking, the exemplary embodiment of FIG. 5 implements a bumpless transfer given the best data at hand. To this end, a block 154 accesses the record of feedback information stored in, for instance, the memory of the transfer and failure detection module 40 (see FIG. 1) to gather recent feedback information of an uncorrupted or otherwise non-faulty nature. As part of this determination, the disclosed controller and method may include an analysis of the feedback information record that assesses when the feedback information became untrustworthy or otherwise faulty. Alternatively, the controller and method may reference data associated with feedback information from a certain past point in time, either predetermined or selected by the operator. Next, the drive signal for the current feedback control scheme is calculated (or recalculated, as it were) in a block 156 given the recalled feedback information from the memory. With the calculated drive signal in hand, a bumpless transfer operation is implemented in a block 158 and may, for instance, follow the steps of the routine described in connection with FIG. 4.

Practice of the disclosed controller and method is not limited to use in conjunction with particular types of feedback mechanisms, such as position control or pressure control. Thus, the disclosed controller and method may be implemented with any one of a variety of sensors known to those skilled in the art at present or in the future. At one level, selection of sensor type may be driven by what is most appropriate for the particular process control device being controlled. Compatibility of the disclosed controller and method exists with any sensor capable of providing feedback or other information indicative of the operation of the process control device being controlled, and regardless of the manner in which the information is indicative of the operation of the process control device. Such broad compatibility of the disclosed controller and method supports implementation across a wide array of processes and process control contexts.

Although the foregoing embodiments are described in connection with a controller and method involving two different control schemes, use or practice of the disclosed controller and method is not limited to a two scheme context, nor is it limited to a context in which pressure and position sensors are relied upon as the exclusive means for feedback control. Similarly, the controller need not be a digital valve controller, nor is the method limited to operation in connection with a valve or other pneumatically driven process control device. Rather, practice of the disclosed controller and method is useful in any number of process control contexts, in connection with any process control device, and in conjunction with different feedback control schemes other than PID control. It should be noted that the servo control modules associated with the control schemes need not be identical, and instead may be optimized to suit the control scheme.

The memory of the transfer and failure detection module 40 may constitute a portion of a data storage device that provides memory functionality for any number of the aforementioned routines executed by the controller 10, or for any number of the aforementioned components of the controller 10. The memory may be integrated with, or separate from, other components of the controller 10, and may be provided by any one of a number of devices available and well known to one skilled in the art.

Although the components and aspects of the disclosed controller and method are described hereinabove and shown in the figures as separate modules or blocks, each of the components and aspects may be executed or implemented via any combination of hardware, software, and firmware, either separately or in combination with one or more other components, modules, or other aspects of the disclosed controller and method. Each of the routines described hereinabove may be implemented via instructions provided for execution by a general purpose computer, a microprocessor, or other computer processor, and may be stored in a computer-readable medium (such as a memory in communication with the processor), either alone or in combination with one or more of the other routines, and either alone or in combination with any other hardware or firmware involved in the implementation of the control routines and method.

More generally, embodiments of the disclosed controller and method may be implemented in any combination of hardware, software, or firmware. Some embodiments may be implemented as computer programs executing on programmable systems comprising at least one processor or processing system, a data storage system (including volatile and non-volatile memory and/or storage elements), at least one input device, and at least one output device. Program code may be applied to input data to perform the functions described herein and generate output information. The output information may be applied to one or more output devices, in known fashion. A processing system may include any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, practice of the disclosed system and method is not limited to any particular programming language. In any case, the language may be a compiled or interpreted language.

The programs may be stored on a storage media or device (e.g., floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the routines or steps described herein. Embodiments of the disclosed controller and method may also be considered to be implemented as a machine-readable storage medium, configured for use with a processing system, where the storage medium so configured causes the processing system to operate in a specific and predefined manner to perform the functions described herein.

The foregoing description is given for clearness of understanding only, and no unnecessary limitations should be understood therefrom, as modifications within the scope of the invention may be apparent to those having ordinary skill in the art.

What is claimed is:

1. A controller for a process control device with first and second sensors that generate respective feedback information indicative of operation of the process control device, the controller comprising:

a first servo control module to generate a first drive signal based on the feedback information from the first sensor for control of the process control device in accordance with a first control mode;

a second servo control module to generate a second drive signal based on the feedback information from the second sensor for control of the process control device in accordance with a second control mode; and a feedback control transfer module to transfer control of the operation of the process control device between the first control mode to the second control mode based on the feedback information from the first sensor, wherein the feedback control transfer module comprises a memory that maintains a record of the feedback information from the first sensor, and wherein the feedback control transfer module is capable of extracting a portion of the feedback information indicative of uncorrupted data recently received from the first sensor.

2. A method of controlling a process control device with first and second sensors that generate respective feedback information indicative of operation of the process control device, the method comprising the steps of:
   generating a first drive signal based on the feedback information from the first sensor;
   providing the first drive signal to the process control device to control operation of the process control device; and
   transferring control of the process control device to a second drive signal based on the second sensor by initially generating the second drive signal based on the first drive signal, wherein the control transferring step comprises of adjusting an integral controller used to generate the second drive signal.

3. The method of claim 2, wherein the control transferring step comprises the step of detecting whether the first sensor has failed based on an analysis of the feedback information from the first sensor.

4. The method of claim 2, wherein the adjusting step comprises the step of utilizing past values of the feedback information from the first sensor to obtain uncorrupted data for the control transferring step.

5. A controller for a process control device with first and second sensors that generate respective feedback information indicative of operation of the process control device, the controller comprising:
   a first servo control module to generate a first drive signal based on the feedback information from the first sensor for control of the process control device in accordance with a first control mode;
   a second servo control module to generate a second drive signal based on the feedback information from the second sensor for control of the process control device in accordance with a second control mode; and
   a feedback control transfer module to transfer control of the operation of the process control device between the first control mode to the second control mode based on the feedback information from the first sensor, wherein the second servo control module initially generates the second drive signal in accordance with the first drive signal in a transfer of control from the first control mode to the second control mode.

6. The controller of claim 5, wherein the feedback control transfer module comprises a failure detection module capable of detecting that the feedback information from the first sensor is no longer sufficiently indicative of the operation of the process control device.

7. The controller of claim 5, wherein the feedback control transfer module is responsive to a user command to initiate transfer of the control of the process control device from the first control mode to the second control mode.

8. The controller of claim 5, wherein the first sensor is a position sensor and wherein the second sensor is a pressure sensor.

9. The controller of claim 5, wherein the feedback control transfer module comprises a memory that maintains a record of the feedback information from the first sensor, and wherein the feedback control transfer module is capable of extracting a portion of the feedback information indicative of uncorrupted data recently received from the first sensor.

10. The controller of claim 9, wherein the second servo control module comprises an integral controller component having an output signal that is adjusted based on the portion of the feedback information indicative of uncorrupted data to minimize discontinuous movement of the process control device during transfer of the control of the process control device from the first control mode to the second control mode.

11. The controller of claim 5, wherein the feedback control transfer module and the second servo control module adjust the second drive signal based on the first drive signal in preparation for a transfer of feedback control of the process control device from the first control mode to the second control mode.

12. The controller of claim 11, wherein the second servo control module continuously calculates an adjustment factor based on the control signal to be utilized to adjust the second drive signal upon direction from the feedback control transfer module.

13. The controller of claim 11, wherein the second drive signal is adjusted such that the first and second drive signals are equal upon the transfer of feedback control.

14. The controller of claim 13, wherein the second servo control module comprises an integral controller component, an output signal of which is adjusted such that the second drive signal equals the control signal in the preparation for the transfer of feedback control.

15. The controller of claim 14, wherein the integral controller component comprises an accumulator, and wherein the accumulator is reset to adjust the second drive signal in the preparation for the transfer of feedback control.

16. A method of controlling a process control device, the method comprising the steps of:
   generating a first drive signal for control of the process control device in accordance with a first servo control mode;
   generating a second drive signal for control of the process control device in accordance with a second servo control mode;
   generating a control signal for the process control device in accordance with the first servo control mode and from the first drive signal;
   receiving a feedback signal indicative of the operation of the process control device in response to the control signal; and
   transferring control of the process control device to the second servo control mode during operation of the process control device based on the feedback signal such that the control signal will be generated from the second drive signal, wherein transferring control further comprises the step of detecting a failure in the operation of the process control device by analyzing the feedback signal to determine whether a sensor of the process control device associated with the first servo control mode has failed.

17. The method of claim 16, wherein the feedback analyzing step, the failure detecting step, and the control transferring step are performed autonomously.

18. The method of claim 16, wherein the second drive signal generating step is not performed until initiation of the control transferring step.

19. The method of claim 16, wherein the first and second servo control modes are responsive to position and pressure sensors of the process control device, respectively.

20. The method of claim 19, further comprising the step of maintaining a data record of the feedback signal such that the control transferring step comprises the step of extracting information from the data record indicative of uncorrupted position data from the position sensor.

21. The method of claim 20, wherein the second drive signal generating step comprises the step of adjusting an integral controller associated with the second servo control mode based on the information indicative of uncorrupted position data from the position sensor.

22. The method of claim 16, wherein the second drive signal generating step comprises the step of initializing the second drive signal based on the feedback signal.

23. The method of claim 22, wherein the second drive signal initializing step comprises the step of calculating a transition value for the first drive signal based on the feedback signal.

24. The method of claim 23, wherein the second drive signal initializing step comprises the step of adjusting an output of an integral controller associated with the second servo control mode based on the transition value of the first drive signal.

25. The method of claim 24, wherein the integral controller adjusting step comprises the step of setting the second drive signal equal to the first drive signal.

26. The method of claim 16, further comprising the step of receiving a second feedback signal indicative of the operation of the process control device.

27. The method of claim 26, wherein the control transferring step comprises the step of generating a transition level of the control signal based on the first-named feedback signal, and wherein the second drive signal generating step comprises the step of calculating an initial level of the second drive signal based on the second feedback signal and the transition level of the control signal.

28. The method of claim 27, wherein the initial level calculating step comprises the step of calculating proportional and derivative controller values from the second feedback signal, and wherein the initial level calculating step comprises the step of resetting an accumulator output of an integral controller associated with the second servo control mode based on a difference between the transition level of the control signal and a sum of the proportional and derivative controller values.

* * * * *